United States Patent [19]

Po' et al.

[11] Patent Number: 5,213,856

[45] Date of Patent: May 25, 1993

[54] COPOLYESTERS HAVING AN IMPROVED COMBINATION OF PROPERTIES

[75] Inventors: Riccardo Po'; Paolo Cioni; Ernesto Occhiello; Fabio Garbassi, all of Novara, Italy

[73] Assignee: Istituto Guido Donegani S.p.A., Novara, Italy

[21] Appl. No.: 810,903

[22] Filed: Dec. 20, 1991

[30] Foreign Application Priority Data

Dec. 24, 1990 [IT] Italy ................... 22538 A/90

[51] Int. Cl.$^5$ ............................................. B29D 23/00
[52] U.S. Cl. ..................... 428/34.1; 528/272; 528/298; 528/302; 528/305; 528/307; 528/308; 528/308.6; 525/444; 428/35.7; 428/480
[58] Field of Search ............... 528/272, 298, 302, 305, 528/307, 308, 308.6; 525/444; 428/480, 34.1, 35.7

[56] References Cited

U.S. PATENT DOCUMENTS

| | | | |
|---|---|---|---|
| 4,093,603 | 6/1978 | Jackson, Jr. et al. | 528/272 |
| 4,234,708 | 11/1980 | Edelman et al. | 525/444 |
| 4,388,456 | 6/1983 | Barbee et al. | 528/289 |
| 4,398,017 | 8/1983 | Go | 528/173 |
| 4,403,090 | 9/1983 | Smith | 528/272 |
| 4,554,328 | 11/1985 | Sinker et al. | 525/437 |
| 4,578,437 | 3/1986 | Light et al. | 525/444 |
| 4,622,268 | 11/1986 | Yatsu et al. | 428/480 |
| 4,692,506 | 9/1987 | Yatsu et al. | 528/296 |
| 5,039,780 | 8/1991 | Hashimoto et al. | 528/194 |

*Primary Examiner*—John Kight, III
*Assistant Examiner*—Sam A. Acquah
*Attorney, Agent, or Firm*—Oblon, Spivak, McClelland, Maier & Neustadt

[57] ABSTRACT

Copolyesters having an improved combination of barrier, mechanical, thermal and rheological properties and consisting of acylic and glycolic radicals, wherein the acylic radicals derive from at least isophthalic acid and 2,6-naphthalene dicarboxylic acid and at least 90% by mols of the glycolic radicals derive from ethylene glycol.

10 Claims, No Drawings

COPOLYESTERS HAVING AN IMPROVED COMBINATION OF PROPERTIES

The present invention relates to amorphous copolyesters having an improved combination of properties.

More in particular, the present invention relates to copolyesters which have an excellent combination of barrier, mechanical, thermal and rheological properties and are particularly suitable for being used in the packing of foodstuffs.

The thermoplastic polyesters and in particular polyethyleneterephthalate (PET) are polymers which are widely used in the packing sector of foodstuffs, pharmaceuticals and chemicals as they are generally characterized by good mechanical and barrier properties and are in accordance with the regulations in force in the nutritional sector.

It is known, however, that for a few types of aliments, such as e.g. wine and beer, the barrier properties of PET and of other polyesters and copolyesters towards oxygen are not satisfactory. As is inferable from the maximum tolerance values of foodstuffs to oxygen reported by M. Salame on "Plastic Film Technology" (K. M. Finlayson Ed., Technomic, Lancaster 1989), in order to store wine or beer for at least 120 days in 1-liter bottles, materials having permeabilities respectively lower by 2 and 4 times than the one of PET are required.

Another limitation exhibited by PET resides in the difficulty of utilizing, for the molding of hollow containers, the blow molding technology, since the viscosity of the molten polymer is not high enough. For this reason, hollow bodies made of PET are produced by means of a preliminary injection molding of a cylindrical parison, which is then stretched and blown at a temperature above the glass transition temperature in order to form the final container.

Furthermore, according to what stated by G. W. Halek in Journal of Polymer Science, Polymer Symposia (vol. 74, pages 83-92, 1986), the PET high processing temperatures, exceeding 270° C., give rise to the formation of acetaldehyde, which, even in minimum concentrations, imparts a disagreeable back-taste to foodstuffs.

Several attempts were made to try to overcome one or more of the above-mentioned drawbacks. Thus, for example, to improve the melt flow characteristics of the molten polyesters in order to make them moldable by blow molding, it was proposed, in U.S. Pat. Nos. 4,234,708 and 4,554,328, to use polyesters based on terephthalic acid and ethylene glycol containing cross-linking agents and chain terminators. A different approach to solve the problem of flowability is suggested in U.S. Pat. Nos. 4,093,603 and 4,398,022, which describe amorphous copolyesters containing cyclohexanedimethanol. These copolyesters are moldable at a lower temperature as compared with the PET homopolymer, thereby achieving more favourable flowability conditions.

As regards the improvement of the barrier properties of the polyesters, it is known from the art that polyethylene isophthalate (PEI) and the copolyesters having a predominant content of isophthalic radicals exhibit a lower permeability to oxygen than PET. U.S. Pat. No. 4,578,437 describes mixtures of PEI with other copolyesters of the terephthalic acid, for which mixtures a permeability to carbon dioxide lower than the one expectable from a trend proportional to the composition is observed. In such mixtures, however, the permeability to oxygen seems substantially proportional to the content of isophthalic units. U.S. Pat. Nos. 4,398,017, 4,622,268 and 4,388,456 describe isophthalic acid copolyesters having improved barrier properties and containing, respectively, also aromatic or alkylaromatic diols, aromatic hydroxyacids and dicarboxyphthalimides. Lastly, U.S. Pat. No. 4,403,090 describes copolyesters having glass transition temperatures (Tg) lower than or equal to 70° C., prepared from mixtures of isophthalic acid with up to 50% of a different diacid. In particular, in example 4 of said patent, a copolymer is described, which is obtained starting from ethylene glycol and from a mixture of dimethylisophthalate with 15% by mols of dimethyl-2,6-naphthalene dicarboxylate. Such copolymer, the permeability to oxygen thereof being little lower than the one of PEI and the $T_g$ being equal to 67° C., could not be utilized to produce articles to be subjected to the thermal cycles of the food industry, a few of which are above the threshold of 70° C.

It is an object of the present invention to prepare copolyesters endowed with an excellent combination of barrier, thermal, rheological and mechanical properties, which make them particularly suited to the use in the packing sector of foodstuffs and, in particular, of products such as wine and beer.

A further object of the present invention is to prepare copolyesters having a permeability to oxygen lower than 1.5 ($cm^3 \cdot mm/m^2 \cdot 24$ hr. atm.) and a glass transition temperature equal to or higher than 70° C.

More in particular, it is an object of the present invention to provide copolyesters having high barrier properties, suited to the production of formed articles capable of withstanding the thermal cycles of the food industry.

It has now been found by the Applicant that these and still further objects are achieved by amorphous thermoplastic copolyesters consisting of acylic and glycolic radicals, in which the acylic radicals derive from at least isophthalic acid and 2,6-naphthalene dicarboxylic acid, the latter being present in amounts higher than 20% by mols referred to the total of the acylic radicals, and at least 90% by mols of the glycolic radicals derive from ethylene glycol.

Thus, it is an object of the present invention to provide amorphous copolyesters prepared by reacting an acid component and a glycolic component, wherein the acid component essentially consists of 50 to 80% by mols of isophtalic acid or a derivative thereof, and of 50-20% by mols of 2,6-naphthalenedicarboxylic acid or a derivative thereof, and the glycolic component substantially consists of ethylene glycol in an amount of from 90 to 100% by mols referred to the total molar amount of glycols and of from 10 to 0% by mols of other aliphatic or cycloaliphatic glycols.

Still a further object of the present invention are formed articles such as, for example, hollow containers, sheets, plates and films, produced starting from said copolyesters.

The term "derivative" means the acylic halides, the esters and the anhydrides of the corresponding diacid or the oligomers of the dicarboxylic acid with ethylene glycol, optionally in admixture with up to 10% by mols of other aliphatic or cycloaliphatic glycols.

To the acid component it is possible to add, optionally, also a third dicarboxylic acid or a derivative thereof having both aliphatic and aromatic nature and different from the two preceding acids, in an amount from 0 to 5% by mols referred to the sum of the other two acids.

Preferably, the acylic radicals of the copolyesters of the present invention essentially derive from 60–80% by mols isophthalic acid or a derivative thereof and from 40 to 20% by mols 2,6-naphthalenedicarboxylic acid or a derivative thereof. The third dicarboxylic acid or its derivative, different from the two preceding acids, having both aromatic and aliphatic nature, can optionally be present in an amount of from 0 to 2% by mols calculated on the sum of the other two acids.

Any third dicarboxylic acid or a derivative thereof can be added to the acid component as a function of the particular final characteristics to be imparted to the copolyesters of the present invention. In particular, the following dicarboxylic acids are preferred: terephthalic, 4,4'-diphenyldicarboxylic, 1,3-phenylenedioxydiacetic, cyclohexanedicarboxylic, 4,4'-oxydibenzoic, 1,4-phenylenedioxydiacetic, succinic, adipic, decanedioic, dodecanedioic and p-hydroxybenzoic acids.

Any aliphatic or cycloaliphatic glycol can be utilized in addition to ethylene glycol in the glycolic component of the copolyesters of the present invention. The preferred among them are: diethylene glycol, propylene glycol, hexanediol, butanediol, 1,4-cyclohexanedimethanol, 1,3-cyclohexanedimethanol, meta- or para-xylylenediols and polyethylene glycols having a molecular weight up to 1,000.

The copolyesters of the present invention are prepared by means of a polycondensation reaction, where the diacid component and the glycolic component are reacted in proper proportions and conditions, optionally in the presence of a catalyst, in accordance with what is generally described in the art, such as e.g. in the article by F. Pilati published in "Comprehensive Polymer Science" G. C. Eastmond et Al. Eds., Pergamon Press, Oxford 1989, vol. 5, page 275 and following. Among the different preparation methods described, there are preferred the two-step methods, which comprise the melt polycondensation of the dicarboxylic acids esterified with $C_1$–$C_6$ aliphatic alkyls, with ethylene glycol either alone or in admixture, added in an excess of 50–120% by mols referred to the diacid component.

In a typical preparation starting from the methyl diesters of dicarboxylic acids and ethylene glycol, the reaction mixture, which contains also the catalyst, is degased, placed in an inert atmosphere and heated to 180°–200° C., at which temperature the methanol, released during the alcoholysis reaction, distilles. The temperature is then gradually raised up to 280°–290° C. while the pressure is lowered to 0.1–0.5 torr in order to favor the distillation of the glycol in excess and the polycondensation with consequent formation of the polymer.

Useful catalysts for preparing the copolyesters of the present invention can be various compounds of acid nature such as, for example, protic acids such as sulphuric acid and p-toluenesulphonic acid, or Lewis acids such as zinc, manganese, cobalt or lead acetates, or furthermore acid oxides such as antimony or germanium oxides, or it is possible to use alcoholates of transition metals such as tetraisopropyl titanate. For preparing the polyesters described in the present invention it is preferable to use catalytic systems consisting of mixtures of antimony oxide with zinc, cobalt or manganese acetates, which, at the polymer processing temperatures, are less active in the catalysis of the acetaldehyde formation reaction and do not lead to the formation of colored products.

The copolyesters of the present invention are characterized by oxygen permeability values (measured according to manometric method ASTM D 1434, at 25° C. and 0% of relative humidity) lower than 1.5 ($cm^3$.mm/$m^2$.24 hr.atm.) and preferably equal to or lower than 1.0 ($cm^3$.mm/$m^2$.24 hr.atm.).

Furthermore, they surprisingly exhibit permeability values remarkably lower than the ones which can be calculated by means of linear interpolation among the permeability values of the polyesters obtained, under the same preparation conditions, from each of the constituents of the acid component, individually taken.

The copolyesters of the present invention have inherent viscosities (determined on solutions of about 0.25 g/dl of polymer in a phenol/1,1,2,2-tetrachloroethane 60/40 by weight mixture, at 30° C.) ranging from 0.5 to 1.5 dl/g and preferably ranging from 0.6 to 1.2 dl/g. Said inherent viscosity values can be obtained preferably by direct melt polymerization, without any upgrading of the polymer in the solid state, with consequent simplification of the production process.

The rheological behavior of the copolyesters of the present invention is similar to the one of the polyesters generally utilized in extrusion-blowmolding processes. In particular, such copolyesters are characterized by melt viscosities, at a shear rate equal to zero, measured at the molding temperature, higher than 500 Pa.s. and, preferably, higher than 1,000 Pa.s., and by an evident decrease of the melt viscosity as the shear rate increases, contrary to what happens in the case of PET, where the variation is very little.

Lastly, the copolyesters of the present invention are capable of meeting the thermal stability characteristics required for the use of polymeric containers in the food industry, where filling operations in hot conditions are frequent. In particular, they are characterized by glass transition temperatures, measured by scanning calorimetry (DSC), equal to or higher than 70° C., and therefore they are in line with the thermal behaviour of PET, generally considered as sufficient for many appliances.

The copolyesters described in the invention can contain also one or more additives such as dyes, pigments, plasticizers, antioxidants, stabilizers, etc., utilized in the amounts generally known in the art. Said additives can also be added either directly to the reaction mixture, or to the final polymer.

The copolyesters of the present invention can be formed by means of the conventional technologies, in particular for producing hollow containers, films and sheets. Furthermore, they are utilizable along with other polymeric materials for producing bonded laminates or other multilayer articles or for obtaining mixtures. The copolyesters of the present invention can be co-extruded between two or more layers of polymers in order to impart barrier properties to the bonded article obtained.

The containers prepared from the copolyesters of the present invention are particularly suited to the protection of foodstuffs, medicaments and similar substances. The advantages of such containers substantially derive, in these appliances, from the low permeability to oxygen as compared with PET.

The following examples are given to better illustrate the present invention, but they are by no way to be considered as a limitation of the claims.

The polyesters mentioned or described in the examples are characterized by one or more of the parameters, the symbol, name and method of measurement thereof are reported hereinafter.

Perm(O$_2$): permeability to oxygen, measured on thermocompressed specimens measuring 100×100×0.5 mm, using a Lyssy L100-3001 apparatus. The measurements were made at a temperature of 25° C. and at 0% of relative humidity according to the manometric method (ASTM D-1434).

T$_g$: glass transition temperature, measured by means of differential scanning calorimetry (DSC) on a Perkin Elmer DSC-7 apparatus using 8–12 mg specimens.

Vis$_{in}$: inherent viscosity, determined on polymer solutions at a concentration of about 0.25 g/dl in a phenol/1,1,2,2-tetrachloroethane 60/40 by weight mixture, at a temperature of 30° C.

Vis$_f$: melt viscosity, measured by means of a capillary rheometer Rheograph-2001 using a capillary tube having a diameter of 1.0 mm. Unless otherwise specified, the measurement was made at 230° C.

Before any extrusion or molding operations, all the polyesters and copolyesters were dried under vacuum (10 torr) for 24 hours at temperatures ranging from 70° to 100° C., in accordance with what is known to those who are conversant with the art.

EXAMPLE 1

COMPARATIVE TEST

Into a 500 ml glass flask there were introduced, in an inert atmosphere, 165.0 g of dimethylisophthalate, 111.1 g of ethylene glycol, 428 mg of zinc acetate dihydrate and 81 mg of antimony trioxide. The reaction mixture was brought to 180° C. and maintained at this temperature for about 90 minutes, during which the methanol distillation began. The temperature was then gradually brought up to 240° C., while going on to remove methanol. Vacuum was then applied till reaching a pressure of 0.1 torr and the temperature was raised up to 290° C. Such conditions were maintained for further 30 minutes, during which the ethylene glycol excess was distilled in order to promote the polycondensation reaction and the increase of the polyester molecular weight. On conclusion of the reaction, a polymer consisting of polyethylene isophthalate having a vis$_{in}$=0.41 dl/g was obtained. The permeability characteristics are reported in the Table.

EXAMPLE 2

COMPARATIVE TEST

A polymerization was conducted under the same conditions of comparative example 1, but using a reaction mixture consisting of 98.2 g of dimethyl-2,6-naphthalene-dicarboxylate, 52.8 g of ethylene glycol, 205 mg of zinc acetate dihydrate and 40 mg of antimony trioxide, and bringing the final temperature to 300° C. instead of to 290° C. On conclusion of the reaction, a polymer consisting of polyethylene-2,6-naphthalenedicarboxylate (PEN) having vis$_{in}$=0.64 dl/g was obtained. The permeability characteristics are reported in the Table.

EXAMPLE 3

COMPARATIVE TEST

It was operated according to comparative example 2, but using 70.0 g of dimethylterephthalate, 70.0 g of dimethylisophthalate, 94.0 g of ethylene glycol, 363 g of zinc acetate trihydrate and 67 mg of antimony trioxide. On conclusion of the reaction, a polymer consisting of polyethylene-(terephthalate-co-isophthalate) having vis$_{in}$=0.70 dl/g was obtained. The permeability characteristics are reported in the Table.

EXAMPLE 4

The procedure of comparative example 1 was repeated, using 42.0 g of dimethyl-2,6-naphthalene dicarboxylate, 98.0 g of dimethylisophthalate, 88.1 g of ethylene glycol, 345 mg of zinc acetate dihydrate and 64 mg of antimony trioxide. On conclusion of the reaction, a polymer consisting of polyethylene-(isophthalate-co-2,6-naphthalenedicarboxylate) having a vis$_{in}$=0.63 dl/g was obtained. The permeability characteristics are reported in the Table.

EXAMPLE 5

The procedure of comparative example 2 was repeated, using 60.0 g of dimethyl-2,6-naphthalenedicarboxylate, 60.0 g of dimethylisophthalate, 72.3 g of ethylene glycol, 280 mg of zinc acetate dihydrate and 52 mg of antimony trioxide. On conclusion of the reaction, a polymer consisting of polyethylene-(isophthalate-co-2,6-naphthalenedicarboxylate) having a vis$_{in}$=0.67 dl/g, a melt viscosity of 1,800 Pa.s at a shear rate of 10 s$^{-1}$, and of 500 Pa.s at a shear rate of 1,000 s$^{-1}$ was obtained. The permeability characteristics are reported in the Table.

EXAMPLE 6

Into a stainless steel AISI-304 reactor there were introduced, in a nitrogen inert atmosphere, 4,200 g of dimethyl-2,6-naphthalenedicarboxylate, 2,360 g of ethylene glycol, 0.85 g of manganese acetate tetrahydrate and 0.75 g of cobalt acetate tetrahydrate. The mixture was brought to 180° C. and the methanol liberated during the alcoholysis reaction was distilled. The temperature was then brought to 220° C., and 0.72 g of phosphorous acid and 36 g of stabilizer IRGANOX® 1010 produced by CIBA GEIGY was introduced into the reactor, followed by 9,779 g of polyethyleneisophthalate oligomers, characterized by an (ethylene glycol)-/(isophthalic acid) ratio equal to 1.73, and by 4.0 g of antimony trioxide. Subsequently, the pressure was lowered to 0.5 torr, the temperature was brought to 280° C. and the reaction was carried on for three hours, progressively distilling the ethylene glycol in excess. On conclusion of the reaction, a polymer consisting of polyethylene-(isophthalate-co-2,6-naphthalenedicarboxylate) having a vis$_{in}$=0.87 dl/g was obtained. The permeability characteristics are reported in the Table.

TABLE

| EXAMPLE | T$_g$ (C) | Perm (O$_2$) (cm$^3$ · mm/m$^2$ · 24 hr · atm) |
|---|---|---|
| Ex. 1* | 59 | 1.40 |
| Ex. 2* | 120 | 1.70 |
| Ex. 3* | 65 | 2.30 |
| Ex. 4 | 73 | 1.10 |
| Ex. 5 | 80 | 1.30 |
| Ex. 6 | 73 | 0.50 |

*Comparative examples.

We claim:

1. Copolyesters having an improved combination of barrier, mechanical, thermal and rheological properties and a glass transition temperature equal to or higher than 73° C. and an oxygen permeability equal to or lower than 1.1 cm³.mm/m².24 hr.atm., measured according to manometric method ASTM D-1434, at 25° C. and 0% relative humidity, consisting of acrylic and glycolic radicals, wherein the acylic radicals derive from at least isophthalic acid and 2,6-naphthalenedicarboxylic acid, the latter being present in amounts of 20% to 40% by mols referred to the sum of acylic radicals, while at least 90% by mols of glycolic radicals derive from ethylene glycol.

2. The copolyesters according to claim 1, having an inherent viscosity ranging from 0.5 to 1.5 dl/g, determined on polymer solutions at a concentration of about 0.25 g/dl in a phenol/1,1,2,2-tetrachloroethane 60/40 by weight mixture, at a temperature of 30° C., and a melt viscosity at a shear rate equal to zero, measured at the molding temperature, higher than 500 Pa.s.

3. The copolyesters according to any one of claims 1 or 2, wherein the acylic radicals derive from 60 to 80% by mols isophthalic acid or a derivative thereof, and from 40 to 20% by mols 2,6-naphthalenedicarboxylic acid or a derivative thereof, while the glycolic radicals derive from 90 to 100% by mols ethylene glycol and from 10 to 0% by mols other aliphatic or cycloaliphatic glycols.

4. The copolyesters according to any one of claims 1 or 2, wherein, in addition, up to 5% by mols of the acylic radicals derive from an aliphatic or aromatic dicarboxylic acid or a derivative thereof, other than isophthalic acid and 2,6-naphthalenedicarboxylic acid.

5. The copolyesters according to any one of claims 1 or 2, wherein the acylic radicals derive from 60 to 80% by mols isophthalic acid or a derivative thereof; from 40 to 20% by mols 2,6-naphthalenedicarboxylic acid or a derivative thereof, and from 0 to 2% by mols, based on the sum of said acids, from a dicarboxylic acid or a derivative thereof of aromatic or aliphatic nature other than isophthalic acid or 2,6-naphthalenedicarboxylic acid.

6. The copolyesters according to claim 4, wherein the dicarboxylic acid other than isophthalic acid or 2,6-naphthalenedicarboxylic acid is selected from terephthalic, 4,4'-diphenyldicarboxylic. 4,4'-oxydibenzoic, 1,4-phenylenedioxydiacetic, 1,3-phenylenedioxydiacetic, cyclohexanedicarboxylic, succinic, adipic, decanedioic, dodecanedioic or p-hydroxybenzoic acids.

7. The copolyesters according to any one of claims 1 or 2, wherein the aliphatic or cycloaliphatic glycol is selected from diethylene glycol, propylene glycol, hexanediol, butanediol, 1,4-cyclohexane dimethanol, 1,3-cyclohexane dimethanol, meta- or paraxylylenediols or polyethylene glycols having a molecular weight up to 1,000.

8. The copolyesters according to any one of claims 1 or 2, wherein the derivatives of the acids are acylic halides, the esters and the anhydrides of said acids, or the oligomers of said acids, or the oligomers of said acids with ethylene glycol, optionally in admixture with up to 10% by mols of other aliphatic or cycloaliphatic glycols.

9. Hollow containers, films, sheets, plates, laminated and bonded articles prepared from the copolyesters as claimed in any one of claims 1 or 2.

10. The copolyester according to any one of claims 1 or 2, wherein the isophthalate radicals derive from an isophthalate oligomer.

* * * * *